(12) United States Patent
Oishi

(10) Patent No.: US 10,266,917 B2
(45) Date of Patent: Apr. 23, 2019

(54) HEAT RESISTANCE COPPER ALLOY MATERIALS

(75) Inventor: Keiichiro Oishi, Osaka (JP)

(73) Assignee: MITSUBISHI SHINDOH CO., LTD., Tokyo (JP)

(*) Notice: Subject to any disclaimer, the term of this patent is extended or adjusted under 35 U.S.C. 154(b) by 716 days.

(21) Appl. No.: 12/555,990

(22) Filed: Sep. 9, 2009

(65) Prior Publication Data

US 2009/0320964 A1   Dec. 31, 2009

Related U.S. Application Data

(62) Division of application No. 10/529,804, filed as application No. PCT/JP03/12041 on Sep. 19, 2003, now Pat. No. 7,608,157.

(30) Foreign Application Priority Data

Mar. 3, 2003   (JP) ................. 2003-055846

(51) Int. Cl.
| | |
|---|---|
| *C22C 9/06* | (2006.01) |
| *B23K 35/30* | (2006.01) |
| *C21D 9/50* | (2006.01) |
| *C22C 9/02* | (2006.01) |
| *C22C 9/04* | (2006.01) |
| *C22F 1/08* | (2006.01) |
| *F28F 21/08* | (2006.01) |
| *B23K 101/14* | (2006.01) |
| *B23K 103/12* | (2006.01) |

(52) U.S. Cl.
CPC .............. *C22C 9/06* (2013.01); *B23K 35/302* (2013.01); *C21D 9/50* (2013.01); *C22C 9/02* (2013.01); *C22C 9/04* (2013.01); *C22F 1/08* (2013.01); *F28F 21/085* (2013.01); *B23K 2101/14* (2018.08); *B23K 2103/12* (2018.08)

(58) Field of Classification Search
CPC .... B23K 2103/12; B23K 35/302; C22C 9/02; C22C 9/04; C22C 9/06; C22F 1/08
USPC .......................... 148/433; 420/472, 473, 475
See application file for complete search history.

(56) References Cited

U.S. PATENT DOCUMENTS

| | | | |
|---|---|---|---|
| 2,074,713 A | 3/1937 | Tross | |
| 4,073,667 A * | 2/1978 | Caron et al. | 148/682 |
| 4,260,432 A * | 4/1981 | Plewes | 148/685 |
| 4,388,270 A * | 6/1983 | Stavish et al. | 420/473 |
| 4,427,627 A * | 1/1984 | Guerlet et al. | 420/496 |
| 4,666,667 A | 5/1987 | Kamio et al. | |
| 5,004,498 A * | 4/1991 | Shimamura et al. | 75/233 |
| 5,322,575 A * | 6/1994 | Endo et al. | 148/554 |
| 5,814,168 A | 9/1998 | Hatakeyama et al. | |
| 6,132,529 A | 10/2000 | Hatakeyama et al. | |
| 6,254,702 B1 | 7/2001 | Hana et al. | |
| 7,608,157 B2 | 10/2009 | Oishi | |
| 7,928,541 B2 | 4/2011 | Miwa et al. | |
| 8,986,471 B2 | 3/2015 | Oishi | |
| 9,163,300 B2 | 10/2015 | Oishi | |
| 9,455,058 B2 | 9/2016 | Oishi | |
| 9,512,506 B2 | 12/2016 | Oishi et al. | |
| 2006/0016528 A1 | 1/2006 | Hatakeyama | |
| 2006/0260721 A1 | 11/2006 | Oishi | |
| 2007/0051442 A1 | 3/2007 | Yamamoto et al. | |
| 2007/0221396 A1 | 9/2007 | Izumida et al. | |
| 2009/0014102 A1 | 1/2009 | Hatakeyama | |
| 2009/0084473 A1 | 4/2009 | Aruga et al. | |
| 2010/0008817 A1 | 1/2010 | Ando | |
| 2010/0047112 A1 | 2/2010 | Fugono et al. | |
| 2010/0206513 A1 | 8/2010 | Hattori et al. | |
| 2010/0297464 A1 | 11/2010 | Oishi | |
| 2011/0056596 A1 | 3/2011 | Oishi | |
| 2011/0100676 A1 | 5/2011 | Oishi | |
| 2011/0200479 A1 | 8/2011 | Mihara et al. | |
| 2011/0265916 A1 | 11/2011 | Oishi | |

(Continued)

FOREIGN PATENT DOCUMENTS

| | | |
|---|---|---|
| CN | 1546701 A | 11/2004 |
| CN | 1693502 A | 11/2005 |
| EP | 1630240 A1 | 3/2006 |

(Continued)

OTHER PUBLICATIONS

Fundamentals of Rockwell Hardness Testing, www.wilsoninstruments.com, 2004, pp. 1-15.*
Data Sheet No. A 6 Cu-DHP, Consel International Pour Le Developpement Du Cuivre, pp. 1, 2 and 4 (1968), submitted herewith as Exhibit B.
Copper Parts Data Book, pp. 88 and 94 (1997), submitted herewith as Exhibit C.
Curriculum Vitae of Dr. Keiichiro Oishi, as of Jul. 2011, submitted herewith as Exhibit D.
Office Action issued in related Taiwanese application 097143579 dated Oct. 24, 2012.
E. Paul Degarmo et al., Materials and Processes in Manufacturing 383-384 (9th ed. 2003), filed in a related application as Exhibit A1.
Copper and Copper Alloys, ASM Specialty Handbook, pp. 3-4, and 454 (2001).
1994 Annual Book of ASTM Standards, vol. 02.01, 480-486 and 514-521 (1994), filed in a related application Exhibit A1.

(Continued)

*Primary Examiner* — Colleen P Dunn
*Assistant Examiner* — Nicholas A Wang
(74) *Attorney, Agent, or Firm* — Griffin and Szipl PC

(57) ABSTRACT

The present invention discloses a heat resistance copper alloy material characterized in that said copper alloy material comprises 0.15 to 0.33 mass percent of Co, 0.041 to 0.089 mass percent of P, 0.02 to 0.25 mass percent of Sn, 0.01 to 0.40 mass percent of Zn and the remaining mass percent of Cu and inevitable impurities, wherein each content of Co, P, Sn and Zn satisfies the relationships $2.4 \leq ([Co]-0.02)/[P] \leq 5.2$ and $0.20 \leq [Co]+0.5[P]+0.9[Sn]+0.1[Zn] \leq 0.54$, wherein [Co], [P], [Sn] and [Zn] are said mass percents of Co, P, Sn and Zn content, respectively; and said copper alloy material is a pipe, plate, bar, wire or worked material obtained by working said pipe, plate, bar or wire material into predetermined shapes.

21 Claims, No Drawings

(56) References Cited

U.S. PATENT DOCUMENTS

| | | | |
|---|---|---|---|
| 2015/0198391 A1 | 7/2015 | Oishi | |
| 2017/0103825 A1 | 4/2017 | Oishi et al. | |

FOREIGN PATENT DOCUMENTS

| | | | |
|---|---|---|---|
| JP | 60-245753 A | | 12/1985 |
| JP | 60-245754 A | | 12/1985 |
| JP | 63-65039 A | | 3/1988 |
| JP | 01-108322 A | | 4/1989 |
| JP | H03229835 | * | 10/1991 |
| JP | 04-272148 A | | 9/1992 |
| JP | 06-094390 A | | 4/1994 |
| JP | 8-120368 A | | 5/1996 |
| JP | 10-130754 | * | 5/1998 |
| JP | 10-130754 A | | 5/1998 |
| JP | 10-168532 | | 6/1998 |
| JP | 11-097609 A | | 4/1999 |
| JP | 11-256255 | | 9/1999 |
| JP | 2001-214226 A | | 8/2001 |
| JP | 2001-316742 | | 11/2001 |
| JP | 2003-268467 | | 9/2003 |
| JP | 2004-137551 | | 5/2004 |
| JP | 2004-292917 A | | 10/2004 |
| TW | 200417616 | | 9/2004 |
| TW | 200706660 | | 2/2007 |
| WO | 2004/079026 A1 | | 9/2004 |
| WO | 2007/139213 A1 | | 12/2007 |
| WO | 2008/099892 A1 | | 8/2008 |
| WO | 2009/107586 A1 | | 9/2009 |

OTHER PUBLICATIONS

Taiwanese office action issued in related matter 099100411 dated Oct. 22, 2013.
Espacenet English Abstract of JP 10-130754 (Exhibit A1), modified 2011.
"Definition of Tensile Strength", at http://metals.about.com/library/bldef-Tensile-Strength.htm (2002), (Exhibit A2).
"Definition of Hardness," at http://metals.about.com/library/bldef-Hardness.htm (2002), (Exhibit A3).
"Definition of Proof Stress," at http://metals.about.com/library/bldef-Proof-Stress.htm (2002), (Exhibit A4).
Pierre Leroux, Breakthrough Indentation Yield Strength Testing (Nanovea 2011), (Exhibit A5).
Copper and Copper Alloys of the ASM Specialty Handbook®, 2001, p. 454 (Exhibit A6).
Copper and Copper Alloys of the ASM Specialty Handbook®, 2001, pp. 3 and 4 (Exhibit A7).
Standards Handbook: Part 2—Alloy Data, Wrought Copper and Copper Alloy Mill Products 34 and 38 (Copper Development Association, Inc. 1985), (Exhibit A8).
Yield Strength—Strength(Mechanics) of Materials, at http://www.engineersedge.com/material_science/yield_strength.htm (downloaded Apr. 18, 2012), two pages.
J.R. Davies (ed.), ASM Specialty Handbook Copper and Copper Alloys 8-9 (ASM International), filed as Exhibit A in related application.
J.R. Davies (ed.), ASM Specialty Handbook Copper and Copper Alloys 243-247 (ASM International 2001), filed as Exhibit D in related application.
International Search Report issued in related application PCT/JP2009/071606, completed Mar. 19, 2010 and dated Apr. 6, 2010.
International Search Report issued in related application PCT/JP2008/070410, completed Jan. 23, 2009 and dated Feb. 10, 2009.
Office Action issued in related Canadian application 2,706,199 dated Dec. 2, 2011.
E. Paul Degarmo et al., Materials and Processes in Manufacturing 402-404, 432-434, 989-998 (John Wiley & Sons, Inc. 2003).
International Search Report issued in related application No. PCT/JP2009/053216, completed May 19, 2009 and dated May 26, 2009.
International Search Report issued in related application No. PCT/JP2009/071599, completed Mar. 19, 2010 and dated Apr. 6, 2010.
ASM Specialty Handbook, Copper and Copper Alloys, 2001, p. 521.
Office Action issued in related Indian Patent Application 3469/DELNP/2010 dated Dec. 20, 2016.
Office Action issued in co-pending related U.S. Appl. No. 14/596,630, dated Sep. 22, 2017.
Office Action issued in co-pending related U.S. Appl. No. 15/297,633, dated Sep. 22, 2017.
JP 2001-316742, Sudo et al., Published Nov. 2001. (machine translation).
JP 2001-214226, Nagata et al., Published Aug. 2001. (machine translation).
Office Action issued in co-pending related U.S. Appl. No. 13/144,034, dated Apr. 20, 2017.

* cited by examiner

HEAT RESISTANCE COPPER ALLOY MATERIALS

This application is a Divisional of U.S. patent application Ser. No. 10/529,804, filed Mar. 30, 2005, which is a National Phase Application in the United States of International Patent Application No. PCT/JP03/012041 filed Sep. 19, 2003, which claims priority on Japanese Patent Application No. 2003-055846, filed Mar. 3, 2003. The entire disclosures of the above patent applications are hereby incorporated by reference.

TECHNICAL FIELD

The present invention relates to the heat resistance copper alloy materials suitable for heat exchanger tube and piping (water supply pipe, hot water supply pipe, gas piping) used for heat exchanger (heat exchanger of instantaneous water heater, hot water supply system, hot water device, air conditioner, refrigerating machine, radiator, or heat exchanger equipped in hot water system, air conditioning system, refrigerating system), pipe arrangement used for other various instruments (electric or chemical apparatus etc.), and pipe materials, plate, bar, wire rod and worked materials (machined in geometry predetermined by brazing) used for their attachments (fin etc.) and other instruments (heating-cooling four-way switching valve etc.).

BACKGROUND ART

In general, heat exchanger tube, fin, flange or body panel composing heat exchanger in instantaneous water heater, hot water supply system, air conditioner, refrigerating machine etc. are produced by using pipe materials (seamless copper alloy tube) or plate made from superior heat resisting phosphorus deoxidized copper (JIS C1220). At the time of the production, the phosphor copper solder (JIS Z3264 BCuP-2) etc. are used as brazing materials, and to braze the heat exchanger tubes, it is necessary for such tubes to be heated to about 800° C. because the melting point of phosphor copper solder is 710° C. in solidus temperature and 795° C. in liquidus temperature.

However, in the case that the heat exchanger tubes made of phosphorus deoxidized copper are locally or wholly heated at as high as 800° C. by brazing, crystal grains of phosphorus deoxidized copper become large. In addition, the matrix strength of phosphorus deoxidized copper is low by its nature, so that the mechanical intensity (for example, tensile strength, proof stress, elongation, fatigue strength, hardness etc.) after heating (after brazing or welding) becomes low remarkably. Although such lowering degradation of the mechanical intensity due to the grain growth in phosphorous deoxidizing copper appears at different levels according to the production conditions where the material for heat exchanger tube etc. is prepared. Such degradation can be recognized remarkably when the material is heated at temperatures higher than 600-700° C. in general. Therefore, in the case of heat exchangers equipped in instantaneous water heater and hot water supply system using heat exchanger tubes made of phosphorus deoxidized copper, there was a problem in the durability since the mechanical intensity of such heat exchanger tubes lowers at the production stage. By way of example, since the heat exchanger tubes in instantaneous water heater, hot water supply system and air conditioner etc., repeat thermal expansion and thermal contraction in turn while in use. Therefore, there is a possibility that the heat exchanger tubes are locally destroyed by fatigue due to the repeated loading, and consequently, the life cycle of the products become short. This problem of durability shows that the phosphorus deoxidized copper cannot be used for the heat exchanger tubes, because the low durability is especially remarkable in the heat exchanger tubes using any heat medium gas aside from HCFC system fluorocarbon. Recently, in order to prevent the discharge of green house gas effect and depletion of ozone layers, $CO_2$ and HFC system fluorocarbon tend to be used instead of conventional HCFC system fluorocarbon as the heat medium gas for heat exchangers equipped in hot water supply system and air conditioner etc. When such $CO_2$ or HFC system fluorocarbon is used as the heat medium, however, the condensing pressure needs to be higher comparing to the case of HCFC system fluorocarbon. Therefore, since the high condensing pressure acts on the heat exchanger tubes of the heat exchanger using heat medium gas aside from HCFC system fluorocarbon in a cycle, proof pressure, namely proof stress of heat exchanger tubes (0.2% yield strength) or yield stress is not high enough. As a result, there is a possibility to produce cracks in the heat exchanger tubes and to cause dimensional change of the heat exchanger tubes by long term use, in a case that the phosphorus deoxidized copper is used for the heat exchanger tube. The same problem occurs in the plate materials used for body panels. For example, in the case of body panels used for heat exchangers of hot water supply system and water heater etc., the local fatigue fracture caused by the repeated stress by the expansion in use and the contraction when not in use may lead to a possible fire accident. In addition, as to the fins installed in heat exchanger tubes of hot water supply system and air conditioner etc., the mechanical intensity (proof stress in particular) lowers remarkably at the production stage, so that the fins may be easily deformed by small external force (by a slight touch of hands or tools during maintenance or cleaning). Thus the thermal efficiency of the heat exchanger will be lost greatly. Furthermore, in the case of the brazed parts (water supply pipes, hot water supply pipes, gas piping, electric apparatus plumbing and chemical machinery plumbing etc.) made of phosphorus deoxidized copper, it is required that the wall thickness must be larger than necessary because of the remarkable lowering degradation of strength after brazing. Also there is a possibility of various kinds of trouble (water leakage, malfunction etc.) originating from the deformation due to small external forces in use and/or during maintenance. In addition, by the grain growth, susceptibility to stress corrosion crack, pitting corrosion and localized corrosion becomes high, while general corrosion resistance becomes low, resulting in many problems when in use.

DISCLOSURE OF THE INVENTION

The present invention was achieved in view of such problems and aims to provide the heat resistance copper alloy suitable as component materials (pipe material, plate material etc.) for the products and parts requiring high proof stress and thermal conductivity such as the heat exchanger tubes of heat exchanger to be heated at high temperature by brazing etc. and be used with heat medium gas aside from HCFC system fluorocarbon.

In order to achieve this object, the present invention proposes a heat resistance copper alloy material of alloy composition described in claim 1 (hereinafter called "the first invention alloy material"), a heat resistant copper alloy material of alloy composition described in claim 2 (hereinafter called "the second invention alloy material"), a heat resistant copper alloy material of alloy composition described in claim 3 (hereinafter called "the third invention alloy material") and a heat resistance copper alloy material of alloy composition described in claim 4 (hereinafter called "the fourth invention alloy material"). All of these invention alloy materials are provided as pipe, plate, bar, and wire materials or materials worked into predetermined shapes by being processed (brazed, welded, cut and pressed etc.) Incidentally, in the following description, a symbol of element in brackets shows the content value of the element.

In other words, the first invention alloy material comprises 0.15 to 0.33 mass percent (preferably 0.16 to 0.30 mass percent, more preferably 0.17 to 0.28 mass percent) of Co, 0.041 to 0.089 mass percent (preferably 0.043 to 0.080 mass percent, more preferably 0.045 to 0.074 mass percent) of P, 0.02 to 0.25 mass percent (preferably 0.03 to 0.19 mass percent, more preferably 0.04 to 0.15 mass percent) of Sn, 0.01 to 0.40 mass percent (preferably 0.02 to 0.25 mass percent, more preferably 0.02 to 0.15 mass percent) of Zn and the remaining mass percent of Cu and inevitable impurities, wherein [Co] mass percent, [P] mass percent, [Sn] mass percent and [Zn] mass percent satisfy the relations of (1) and (2) described below.

In addition, the second invention alloy material comprises 0.11 to 0.31 mass percent (preferably 0.13 to 0.28 mass percent, more preferably 0.15 to 0.26 mass percent) of Co, 0.041 to 0.089 mass percent (preferably 0.043 to 0.080 mass percent, more preferably 0.045 to 0.074 mass percent) of P, 0.02 to 0.25 mass percent (preferably 0.03 to 0.19 mass percent, more preferably 0.04 to 0.15 mass percent) of Sn, 0.01 to 0.40 mass percent (preferably 0.02 to 0.25 mass percent, more preferably 0.02 to 0.15 mass percent) of Zn, 0.01 to 0.17 mass percent (preferably 0.02 to 0.14 mass percent) of Ni and/or 0.01 to 0.15 mass percent (preferably 0.02 to 0.12 mass percent) of Fe and the remaining mass percent of Cu and inevitable impurities, wherein [Co] mass percent, [P] mass percent, [Sn] mass percent, [Zn] mass percent, [Ni] mass percent and [Fe] mass percent satisfy all the relations of (1) through (6) described below.

Furthermore, the third invention alloy material corresponds to the first invention alloy material further including any one of Mn, Mg, Zr, or Y and fourth invention alloy material corresponds to the second invention alloy material further including any of Mn, Mg, Zr, or Y.

In other words, the third invention alloy material comprises 0.15 to 0.33 mass percent (preferably 0.16 to 0.30 mass percent, more preferably 0.17 to 0.28 mass percent) of Co, 0.041 to 0.089 mass percent (preferably 0.043 to 0.080 mass percent, more preferably 0.045 to 0.074 mass percent) of P, 0.02 to 0.25 mass percent (preferably 0.03 to 0.19 mass percent, more preferably 0.04 to 0.15 mass percent) of Sn, 0.01 to 0.40 mass percent (preferably 0.02 to 0.25 mass percent, more preferably 0.02 to 0.15 mass percent) of Zn, 0.01 to 0.20 mass percent (preferably 0.02 to 0.10 mass percent) of Mn or 0.001 to 0.10 mass percent (preferably 0.001 to 0.04 mass percent) of Mg, Zr or Y and the remaining mass percent of Cu and inevitable impurities, wherein [Co] mass percent, [P] mass percent, [Sn] mass percent, [Zn] mass percent, [Mn] mass percent, [Mg] mass percent, [Y] mass percent and [Zr] mass percent satisfy the relations of (1) and (2) described below.

Moreover, the fourth invention alloy material comprises 0.11 to 0.31 mass percent (preferably 0.13 to 0.28 mass percent, more preferably 0.15 to 0.26 mass percent) of Co, 0.041 to 0.089 mass percent (preferably 0.043 to 0.080 mass percent, more preferably 0.045 to 0.074 mass percent) of P, 0.02 to 0.25 mass percent (preferably 0.03 to 0.19 mass percent, more preferably 0.04 to 0.15 mass percent) of Sn, 0.01 to 0.40 mass percent (preferably 0.02 to 0.25 mass percent, more preferably 0.02 to 0.15 mass percent) of Zn, 0.01 to 0.17 mass percent (preferably 0.02 to 0.14 mass percent) of Ni and/or 0.01 to 0.15 mass percent (preferably 0.02 to 0.12 mass percent) of Fe, 0.01 to 0.20 mass percent (preferably 0.02 to 0.10 mass percent) of Mn or 0.001 to 0.10 mass percent (preferably 0.001 to 0.04 mass percent) of Mg, Zr or Y and the remaining mass percent of Cu and inevitable impurities, wherein [Co] mass percent, [P] mass percent, [Sn] mass percent, [Zn] mass percent, [Ni] mass percent, [Fe] mass percent, [Mn] mass percent, [Mg] mass percent, [Y] mass percent and [Zr] mass percent satisfy all the relations of (1) through (6) described below.

$$2.4 \leq A1 \leq 5.2 \tag{1}$$

(preferably $2.7 \leq A1 \leq 4.7$, more preferably $3.0 \approx A1 \leq 4.2$). In addition, $A1=([Co]+0.8[Ni]+0.8[Fe]-0.02)/[P]$. In the cases of the first and the second invention alloy materials which do not contain Ni and Fe, $A1=([Co]-0.02)/[P]$, ($[Ni]=[Fe]=0$).

$$0.20 \leq A2 \leq 0.54 \tag{2}$$

(preferably $0.23 \leq A2 \leq 0.49$, more preferably $0.25 \leq A2 \leq 0.45$). $A2=[Co]+0.5[P]+0.9[Sn]+0.1[Zn]+0.9[Ni]+1.5[Fe]+[Mn]+[Mg]+[Y]+3[Zr]$. In the case of the first invention alloy material which does not contain Ni, Fe, Mn, Mg, Y and Zr, $A2=[Co]+0.5[P]+0.9\cdot[Sn]+0.1$ [Zn] ($[Ni]=[Fe]=[Mn]=[Mg]=[Y]=[Zr]=0$). In addition, in the case of the second invention alloy material which does not contain Mn, Mg, Y and Zr, $A2=[Co]+0.5[P]+0.9[Sn]+0.1[Zn]+0.9[Ni]+1.5[Fe]$ ($[Mn]=[Mg]=[Y]=[Zr]=0$). Furthermore, in the case of the third invention alloy material which does not contain Ni and Fe, $A2=[Co]+0.5[P]+0.9[Sn]+0.1[Zn]+[Mn]+[Mg]+[Y]+3[Zr]$ ($[Ni]=[Fe]=0$).

$$0.15 \leq A3 \leq 0.35 \tag{3}$$

(preferably $0.16 \leq A3 \leq 0.32$, more preferably $0.17 \leq A3 \leq 0.30$). Additionally, $A3=[Co]+0.8[Ni]+0.8[Fe]$.

$$1.2[Ni] < [Co]. \tag{4}$$

$$1.5[Fe] < [Co]. \tag{5}$$

$$[Ni]+[Fe] < [Co]. \tag{6}$$

Co is the essential element to control the grain growth under the high temperature heating conditions (for example, heating condition of about 800° C. at the time of brazing) during the production process or the use of heat exchanger tubes. In other words, by adding Co, the grain growth under the high temperature condition (more than 600-700° C.) is well controlled and the grains in the metal structure can be kept refined. The fatigue resistance of the alloy after high temperature heating is also improved. Such effect by Co addition is not shown well if the quantity of the addition is less than 0.15 mass percent. As shown in the second or the fourth invention alloy material, however, in the case of co-addition of Ni and/or Fe, as discussed below, the effect can be seen enough, even if less than 0.15 mass percent, if the range of Co is equal to or more than 0.11 mass percent since Ni and Fe show the effect as the substitution element of Co. Said effect by Co addition is shown conspicuously by setting the Co quantity to be not lower than 0.16 mass percent (not lower than 0.13 mass percent if Ni and/or Fe are also co-added), and more conspicuously if Co addition is not lower than 0.17 mass percent (not lower than 0.15 mass percent if Ni and/or Fe are also co-added). On the other hand, there is a limit for the Co addition effect. Excessive addition turns out to be meaningless and the effect is not worth of the quantity of addition, but rather such alloy may lose its inherent characteristics such as heat conductivity. In other words, even if Co addition is more than 0.33 mass percent (equal to or more than 0.31 mass percent if Ni and/or Fe are also co-added), not only the expected effect cannot be obtained but the deformation resistance under hot working becomes high while the workability under cold working decreases. Therefore, the original characteristics of copper alloys (heat conductivity etc.) become worse. Of course, since Co is very expensive, there occurs an economic problem if Co addition becomes excessive. In order to obtain the effect by Co addition effectively without said problem, it is preferable that the quantity of Co is not greater than 0.30 mass percent (not greater than 0.28 mass percent if Ni and/or Fe are also co-added) and the best condition is not greater than 0.28 mass percent (not greater than 0.26 mass percent if Ni and/or Fe are also co-added).

P shows the function of suppressing grain growth at high temperature heating in the same manner as Co and the function is dramatically improved by the co-addition of Co. Therefore, the grain growth at high temperature heating is controlled extremely well by co-addition of Co and P and the grains remain refined. The effect by P addition is not realized effectively and falls short of expectation in case where the quantity of the addition is less than 0.041 mass percent. It is necessary that the quantity of P addition is not lower than 0.041 mass percent, not lower than 0.043 mass percent when required to show the enough effect and not lower than 0.045 mass percent as the best mode. However, even if the addition of P is more than 0.089 mass percent, not only the effect is not worth of the additional quantity but also workability under hot working and cold working becomes worse, and original characteristics of copper alloy (heat conductivity etc.) becomes worse. In order to guarantee these characteristics at satisfactory level, it is necessary that the quantity of P addition is not greater than 0.089 mass percent, not greater than 0.080 mass percent preferably, and not greater than 0.074 mass percent as the best mode.

Sn improves the heat resistance of matrix by strengthening the matrix through its solid solution. Furthermore the functions of suppressing the grain growth and expediting the grain refinement are improved by Co and P as described above. Also the precipitation rate of Co and P is accelerated, so that mechanical intensity after high temperature heating is improved. Sn is added to improve corrosion resistance as well as to prevent stress corrosion cracking, pitting corrosion and localized corrosion as much as possible. In order to show the good effect of the Sn addition, it is necessary that the quantity of the addition is not lower than 0.02 mass percent, not lower than 0.03 mass percent preferably and not lower than 0.04 mass percent at the best mode. On the other hand, if the quantity of Sn addition is more than 0.25 mass percent, the mechanical intensity is improved to a certain level with the increasing quantity of Sn. However, not only heat conductivity becomes worse but also the deformation resistance under hot working becomes high and the workability under cold working decreases. In order to realize the effect by Sn addition without decreasing of the heat conductivity, it is necessary that the quantity of Sn addition is not greater than 0.25 mass percent, not greater than 0.19 mass percent preferably and not greater than 0.15 mass percent as the best mode.

Zn addition improves the mechanical intensity by means of reinforcement of the matrix (through its solid solution). In other words, even if the grains are refined, in case that the strength of matrix itself is low, the mechanical intensity of the whole alloy remains low in natural. Zn, therefore, is added to reinforce the matrix. Sn is the same in this point of view, but Zn addition also plays a role to improve brazing characteristics. Namely, wettability of the materials over brazing materials such as phosphor copper solder (JIS Z3264) etc. can be improved by Zn addition. Furthermore, Zn possesses the function of improving corrosion resistance against stress corrosion cracking, pitting corrosion, localized corrosion etc., in the same manner as Sn. To realize the effect of Zn addition, it is necessary that the quantity of addition is not lower than 0.01 mass percent and not lower than 0.02 mass percent preferably. On the other hand, if the quantity of Zn addition exceeds 0.40 mass percent, the heat conductivity deteriorates and also the susceptibility to the stress corrosion cracking becomes high. In order to avoid such problem, it is necessary that the quantity of Zn addition is not greater than 0.40 mass percent and not greater than 0.25 mass percent preferably, and also not greater than 0.15 mass percent as the best mode.

Fe and Ni show the effect of suppressing of grain growth in the same manner as Co. Although the effect is inferior to that of Co, the effect is good enough to be a substitute element of Co. Therefore, even if the quantity of the expensive Co addition is reduced as much as possible, the good effect described above can be seen by the co-addition of Ni and/or Fe with Co. In other words, Ni and Fe lower the limit of Co solid solution into matrix, and they play a role to make the Co function described above effective with the small quantity of Co addition. Consequently, economic effect can be seen since the required quantity of Co decreases. Furthermore, there is an effect to raise the heat conductivity and hot workability by decreasing of the quantity of Co as solid solution. Accordingly, the effect of Ni and Fe addition can be seen in case where the quantity of the added Ni and/or Fe is not lower than 0.01 mass percent. Also in the case where the addition is not lower than 0.02 mass percent, the effect can be seen conspicuously. However, in the case where the quantity of Ni addition is not lower than 0.17 mass percent, and also the quantity of Fe addition is not lower than 0.15 mass percent, the effect is not good enough as expected for the quantity of the addition and there occurs the problem that heat conductivity etc. become worse. In order to avoid the problem, it is necessary that the quantity of Ni addition is not greater than 0.17 mass percent, not greater than 0.14 mass percent preferably, and also in the case of the quantity of Fe, it is necessary to be not greater than 0.15 mass percent and not greater than 0.12 mass percent preferably.

Now, there are many cases where scrap materials of the present invention alloy (disposal heat exchanger tubes etc.) are used as component of raw materials for the present invention alloy materials, and then there is a problem in hot workability because the scrap materials tend to contain S (sulfur constituent). Even if raw materials contain S constituent, however, it forms the precipitates such as MgS and ZrS by combining with Mn, Mg, Y or Zr so that such problem in hot workability can be prevented. Because of the reason, in the case of the third or the fourth invention alloy materials, any of Mn, Mg, Y or Zr must be contained. The formation of the precipitates by Mn, Mg, Y or Zr addition, which helps exclude the negative influence caused by S to hot workability, is shown when the quantity of Mn addition is 0.01 mass percent, and that of Mg, Y or Zr is greater than 0.001 mass percent. However, if Mn, Mg, Y or Zr is added more than necessary, the effect can not be realized as expected and inversely, such excessive addition causes other problems such as decreasing of the heat conductivity. Then the upper limit of the additional quantity is 0.20 mass percent (preferably 0.10 mass percent) in the case of Mn addition and 0.10 mass percent (preferably 0.04 mass percent) in the case of Mg, Mn, Y or Zr addition.

About the additive elements aside from basic element of Cu, those elements are determined in the range as described above. When decision is made, the mutual relations among additive elements should be considered and it is necessary that the all mutual relations (1) to (6) of additive elements should be satisfied to achieve the purpose of the present invention. In other words, it is necessary that each content of additive element is decided within the ranges as described above under the conditions where (1) to (6) are satisfied.

First, since the functions by Co addition and P addition have the close relation each other as described, it is necessary for such functions to be well-balanced upon co-addition. To that end, it is insufficient that each constituent is determined individually and independently within its own range described above and then the ratio between both contents should be determined so that it falls within a certain range. Furthermore, with regards to Ni and Fe, since they have the similar function to Co and work as the substitution element (of Co), it is necessary that their contents should be determined considering the relations with P, in the same manner as the case of Co. In other words, the relation between Co or Co, Ni, Fe content and P content should be determined so as to satisfy the relation of (1). In case of A1<2.4, the effect by the co-addition of Co, Ni, Fe and P is not good enough. The heat conductivity, the original inherent characteristic of copper alloy, is lost and also the workability under cold working becomes worse. The relation of A1≥2.4 is necessary to obtain above effect (effect of Co, Ni, Fe and P co-addition), A1≥2.7 is preferable and A1≥3.0 is optimum. Adversely, in the case of A1>5.2, the effect of the co-addition becomes saturated and also the original characteristics of copper alloy (heat conductivity etc.) become worse. Therefore, A1≤5.2 is necessary, A1≤4.7 is preferable if considering the original characteristics of copper alloy, and A1≤4.2 is optimum.

Second, Ni and Fe function as the substitution elements of Co, but the function can only be partial and the necessary content of Co cannot be replaced fully but only be reduced. Thus, the content of Ni and Fe should be decided by considering the mutual relation between the content of Co and of Ni and Fe. Therefore, the contents of Co, Ni and Fe should be determined so as to satisfy the relations of (3) to (6), where A3, the total content of Co, Ni and Fe is considered based on the contribution of each constituent. In other words, in the case of A3<0.15, the effects of Co, Ni and Fe addition (grain growth suppressing effects under high temperature heating etc.) are not shown enough. In the case of A3>0.35, not only an effect to balance with the added quantity is not provided but also there is a possibility to lower the original characteristics of copper alloy, so the hot extrusion characteristics become worse and the workability of bending etc. under cold working becomes worse. Therefore, in order to avoid such problems and to show the preferable effects by additional constituents at the same time, 0.15≤A3≤0.35 is requested and 0.16≤A3≤0.32 is preferable, and 0.17≤A3≤0.30 is optimum. In addition, since the function of Ni and Fe addition is not superior to the function of Co addition, the co-addition effect of Ni and Fe gets rather worse if Ni and Fe addition exceeds the content of Co by a certain level. Therefore, considering the contribution of Ni and/or Fe so as not to be against the effect of Co, in the case where either Ni or F is added, it is necessary that the relations of (4) or (5) should be satisfied. Meanwhile, in the case where both Ni and Fe are co-added with Co, it is necessary that the relations (4) to (6) should be satisfied.

Third, about the additive elements aside from basic element Cu, the contents should be determined so as to satisfy the relation of (2) considering that A2, which is based on the contribution of each constituent, has an effect on heat conductivity, hot extrusion characteristics, bending characteristics, formability, brazing characteristics and strength after brazing. In other words, in the case of A2>0.54, heat conductivity, hot extrusion characteristics, bending characteristics and formability become worse. Therefore, A2≤0.54 is necessary to assure heat conductivity, hot extrusion characteristics, bending characteristics and formability, and A2≤0.49 is preferable to surely prevent the lowering degradation of such characteristics (heat conduction, hot extrusion characteristics, bending characteristics and formability), and A2≤0.45 is optimum. On the other hand, the satisfactory strength can not be obtained after brazing if A2≤0.20. Therefore, to secure the strength after brazing, A2≥0.20 is necessary, A2≥0.23 is preferable and A2≥0.26 is optimum.

Incidentally, oxygen included in the alloy as unavoidable impurities causes hydrogen brittleness if the content exceeds certain quantity. Therefore, the oxygen content should be controlled to be not greater than 0.007 mass percent, and not greater than 0.004 mass percent preferably. Of course, such reduction of the oxygen content can be practiced by controlling the production conditions as well as by P addition. Therefore, in any cases of the first to the fourth invention alloy materials, it is preferable that quantity of P addition should be determined so that the oxygen content becomes not greater than 0.007 mass percent (preferably 0.004 mass percent).

In addition, in case that the first to the fourth invention alloy materials are used as component materials for brazing products and parts in need of proof stress (for example, heat exchanger tubes of heat exchanger using heat medium gas <$CO_2$, HFC system fluorocarbon etc.> aside from HCFC system fluorocarbon, or fin materials and service (water supply) pipes which are deformed easily by small external force in use or during maintenance), when the alloy composition is determined, it is preferable that 0.2% proof stress (the strength when a permanent set becomes 0.2%) after brazing process or heat treatment of similar condition (by way of example only, heat treatment at 800° C. for 10 minutes) should be not less than 55N/mm$^2$ (not less than 75N/mm$^2$ preferably, and not less than 90N/mm$^2$ more preferably). In addition, the brazing of the copper alloy materials is what we call hard solder using phosphor copper solder or silver brazing alloy at about 800° C. of brazing temperature (in general, for about 10 minutes) as designated in JIS Z3264. At the time of brazing, the brazed materials are also heated to the temperature where the brazing materials are melt. As a result, the brazed copper alloy materials (brazed materials) are heated to the same level as the brazing materials. Therefore, in the present invention, the brazing process of copper alloy materials is not distinguished from general heat treatment of copper alloy materials by the direct heating under similar condition (at around 800° C.), and they are considered as the same heat treatment.

Now, the first to the fourth invention alloy materials show good heat conductivity by being composed based on the described alloy composition, and the strength of these alloys' are superior to pure copper (JIS C1220) and pure aluminum which are widely used for products or components requiring excellent heat conductivity. In order to use these invention materials as the superior materials to pure copper or pure aluminum, at a minimum, higher thermal conductivity is necessary than that of pure aluminum (thermal conductivity: 0.57 cal/cm·sec·° C.), preferably greater than the intermediate value (0.675 cal/cm·sec·° C.) between that of pure aluminum and of pure copper (0.78 cal/cm·sec·° C.), and more preferably, not be lower than 0.70 cal/cm·sec·° C. However, there is a limit for improvement of thermal conductivity by only devising the alloy composition. Thus, the present inventors discovered from the results of many experiments and much study that the thermal conductivity can be dramatically improved by means of devising cooling process etc. (hereinafter called "after-treatment") after the brazing process or after the equal condition of heat treatment.

Based on such discoveries, in the present invention, the first to the fourth invention alloy materials having much improved thermal conductivity by the following heat treatment (brazing process etc.) and after-treatment are proposed.

Firstly, the first, to the fourth invention alloy materials having improved thermal conductivity are proposed by brazing or equivalent treatment such as heat treatment at 800° C. for 10 minutes and subsequently, by special furnace cooling process described below to the heat-treated materials as the after-treatment. In other words, under the after-treatment (hereinafter called "the first after-treatment"), the furnace cooling rate is changed under control of the furnace cooling temperature, so that the rate from 670° C. to 480° C. can be set between 1.5-12° C. per minute. (2.5 to 10° C./minute is preferable), which is slower than the cooling rate in conventional furnace cooling process, 15 to 30° C./minute (20° C./minute in general). Under the first after-treatment, the cooling rate in furnace cooling process is reduced to be slower than the usual furnace cooling within the temperature range from 670° C. to 480° C. As a result, the thermal conductivity of the alloy can be improved by being held at the temperature around 580° C.

Secondly, the first to the fourth invention alloy materials having improved thermal conductivity are proposed by brazing or equivalent treatment such as heat treatment at 800° C. for 10 minutes and subsequently, by conventional furnace cooling process and special re-heating to the heat-treated materials as the after-treatment. In other words, the after-treatment (hereinafter called "the second after-treatment") is that heat treated materials are cooled in the furnace under the conventional condition, and after or before finishing the process, the materials are re-heated under the condition of 480 to 670° C. for 3 to 100 minutes (520 to 640° C. for 10 to 40 minutes is preferable). The equivalent or even better improvement of thermal conductivity compared to the materials treated with the first after-treatment can be expected by such re-heating at about 580° C. after or before said furnace cooling.

Thirdly, the first to the fourth invention alloy materials having improved thermal conductivity and strength are proposed by quenching and re-heating to the heat treated materials with brazing or equivalent treatment such as heat treatment at 800° C. for 10 minutes. In other words, the after-treatment (hereinafter called "the third after-treatment") is that the heat-treated materials are quenched by water or air (including forced air cooling) and re-heated in the same manner as the second after-treatment (re-heated at 480 to 670° C. for 3 to 100 minutes, or preferably 520 to 640° C. for 10 to 40 minutes). The present inventors experimented and found that the conditions of cooling process (principally, the cooling rates) do not have much influence to the improvement of thermal conductivity of the heat-treated materials if re-heated under the given conditions (i.e. improvement of heat conductivity depends on re-heating conditions dominantly). The inventors also found that the improvement of strength is ensured by re-heating after quenching comparing to that of the materials re-heated after the furnace cooling. By the way, depending on the brazing conditions, furnace cooling can not be done satisfactorily because of, for example, lack of space when being brazed on the site of the mill. When this is the case, or strength is required for the brazed materials, the third after-treatment as described above is extremely profitable.

In addition, the first to the fourth invention alloy materials described above are suitable for seamless copper alloy tube or welded copper alloy tube used for the heat exchanger tubes (in particular, the heat exchanger tubes of the heat exchanger employing heat medium gas aside from HCFC system fluorocarbon) of a heat exchanger. They are also suitable for tabular parts of the heat exchanger (fin, body panel, flange etc.) or plate materials used as the component for the connector plates which couple the tabular part (fins) with heat exchanger tube or other parts.

PREFERRED EMBODIMENT OF THE INVENTION

As an example, cylindrical ingot alloy having the compositions which were shown in table 1 to 3 (diameter was 220 mm and length was 275 mm) was heated to 900° C. and extruded to tubes under hot working. Such extruded tubes were immediately cooled by warm water of 60° C. in a tank and then drawn repeatedly under cold working. The drawn tubes were then annealed (heat-treated) at 630° C. for an hour, so that the tube materials with 1 mm wall thickness and 10 mm outside diameter (they could be used as the component of heat exchanger tube of heat exchanger) of the first invention alloy materials of No. 101 to No. 114, the second invention alloy materials of No. 201 to No. 217, the third invention alloy materials of No. 301 to No. 304 and the fourth invention alloy materials of No. 401 to No. 412 were produced. In the production of such tube materials, the extruded tubes with 65 mm outside diameter and 5.5 mm wall thickness (hereinafter called "small diameter extruded tubes") produced by hot extrusion were drawn to the tubes with 10 mm outside diameter and 1 mm wall thickness by repeated cold drawing. As for the first and the second invention alloy materials of No. 103, No. 114, No. 204, No. 211 and No. 215, they were produced by continuously cold-drawing the extruded tubes with 85 mm diameter and 7.0 mm wall thickness (hereinafter called "large diameter extruded tubes") into the same dimension as above (outside diameter 10 mm and wall thickness 1 mm), since reasonable small diameter extruded tubes could not be produced or, even if they were produced, the curve of the small diameter extruded tubes exceeded the reference value (10 cm per 1 m). Incidentally, for the case of large diameter extruded tubes, it was difficult to produce extruded pipe with 10 mm outside diameter and 1 mm pipe wall thickness by the same drawing process as practiced for the small diameter tubes. However, drawn pipe with the equal shape, dimension and quality to the extruded pipe produced from the small diameter extruded tubes could be obtained from large diameter extruded tubes as well by adding 1 to 3 extra processes to the drawing process required for obtaining the tubes with 10 mm outside diameter and 1 mm wall thickness from the small diameter extruded tubes. In addition, square rod ingot (thickness is 35 mm, width is 90 mm and length is 250 mm) cut out of the above-described cylindrical ingot (diameter was 220 mm and length was 275 mm) was heated to 850° C.

and hot-rolled to a plate of 5 mm thickness. After the surface was pickled, the plate was cold rolled to the thickness of 0.41 mm. The plate was then annealed (heat-treated) at 630° C. for an hour and finish cold-rolled to be 0.40 mm thickness, so that the plate materials of the first invention alloy materials of No. 101 to No. 114, the second invention alloy materials of No. 201 to No. 217, the third invention alloy materials of No. 301 to No. 304 and the fourth invention alloy materials of No. 401 to No. 412 which were listed in the table 1 to 3 were produced. Incidentally, the contents of oxygen as the inevitable impurities in each tube and plate obtained as above were 0.0002 to 0.004 mass percent.

As a comparative example, the tubes and plates having the same dimension as that of those obtained from the embodiments were produced from the alloy with the composition listed in the table 4. Out of such comparative alloys numbered with No. 501 through No. 515, No. 501, 502, 503, 510, 511, 512 and 513 were obtained by extruding and annealing the small diameter extruded tubes, whereas No. 515 was provided by drawing and annealing (heat treating) of the large diameter extrusion pipe. As for No. 504 to No. 509 and No. 514 small diameter extrusion pipes and large diameter extrusion pipes could not be provided due to the poor hot extrusion characteristics, and therefore, the pipe materials as final products could not be produced.

And then, extrusion characteristics for the first invention alloy materials of No. 101 to No. 114, the second invention alloy materials of No. 201 to No. 217, the third invention alloy materials of No. 301 to No. 304, the fourth invention alloy materials of No. 401 to No. 412 and the comparative example alloy materials of No. 501 to No. 515 were evaluated by bending the extrusion pipes which were the partly-finished products in the manufacturing process of pipe materials. The results obtained were listed in table 5 to table 8. Here, in table 5 to table 8, "o" meant "superior", indicating that the extrusion pipes (65 mm outside diameter, 5.5 mm wall thickness) having smaller value than the reference value (10 cm per 1 m) were obtained after hot extrusion. "A" meant "good" (no problem for practical use), indicating that the small diameter extrusion pipes could not be produced but the large diameter extrusion pipes (85 mm outside diameter, 7.0 mm wall thick) having smaller value than the reference value after hot extrusion could be produced. "x" meant "inferior" (not suitable for practical use), indicating that not only the small diameter extrusion pipes but also the large diameter extrusion pipes having smaller value comparing to the reference value could not be provided.

Additionally, the following proof stress was measured to confirm the strength after brazing for the pipe materials obtained from the first invention alloy materials of No. 101 to No. 114, the second invention alloy materials of No. 201 to No. 217, the third invention alloy materials of No. 301 to No. 304, the fourth invention alloy materials of No. 401 to No. 412 and the comparative example alloy materials of No. 501 to No. 515 (aside from No. 504 to No. 509 and No. 514 which were not able to be provided as the pipe materials). That is to say, the pipe materials (extrusion pipe with 10 mm outside diameter and 1 mm wall thick annealed at 630° C. for an hour) were heat-treated by being passed through the continued heat treating furnace under the same conditions as employed for the furnace brazing to produce heat exchanger (brazing of heat exchanger parts of heat exchanger tube, fin, body panel and flange etc.). To be more precise, after the materials were being heated at 800° C. for 10 minutes, the materials were cooled in the furnace at the rate of 20° C./minute. And, tensile test on such heat-treated materials was done to measure the 0.2% proof stress (strength where the permanent set becomes 0.2%) by AMSLER universal testing machine. The results were listed in table 5 to table 8. In addition, the same test was done to measure proof stress for the plate materials (finishing cold rolling was done to become 0.40 mm thickness after having annealing at 630° C.) of the first invention alloy materials of No. 101 to No. 114, the second invention alloy materials of No. 201 to No. 217, the third invention alloy materials of No. 301 to No. 304, the fourth invention alloy materials of No. 401 to No. 412 and the comparative example alloy materials of No. 501 to No. 515 (aside from No. 504 to No. 509 and No. 514). The results of the measurements (0.2% proof stress) were omitted because the results were almost accorded with those shown in table 5 to table 8. And, bending characteristics were tested for the pipe materials obtained from the first invention alloy materials of No. 101 to No. 114, the second invention alloy materials of No. 201 to No. 217, the third invention alloy materials of No. 301 to No. 304, the fourth invention alloy materials of No. 401 to No. 412 and the comparative example alloy materials of No. 501 to No. 515 (aside from No. 504 to No. 509 and No. 514 which were not able to be provided as the pipe materials). In other words, the bending characteristics were evaluated by bending degree of R/D (R: radius of curvature (mm) of the internal circumference side in bending region, D: outer diameter (mm) of pipe materials) when a significant wrinkle was appeared on the drawn pipe (annealing at 630° C. for an hour was done for the extrusion pipe with 10 mm outside diameter, 1 mm wall thickness) while being bent to "U"-shape by press working. The results were listed in table 5 to table 8. That is to say, in table 5 to table 8, "o" meant superior bending characteristics, indicating that a significant wrinkle did not appear and the shape of cross-section in bent region was round or almost round at R/D=1. "Δ" meant good bending characteristics (there was no problem in practical use), indicating that a significant wrinkle appeared at R/D=1 but such wrinkle did not appear and the shape of cross-section in the bent area was round or almost round at 1<R/D≤1.5 and "x" meant inferior bending characteristics (not suitable for practical use), indicating that a significant wrinkle appeared at R/D>1.5 and the shape of cross-section was not round but oval.

And the formability was evaluated by Erichsen test for the plate materials obtained from the first invention alloy materials of No. 101 to No. 114, the second invention alloy materials of No. 201 to No. 217, the third invention alloy materials of No. 301 to No. 304, the fourth invention alloy materials of No. 401 to No. 412 and the comparative example alloy materials of No. 501 to No. 515 (aside from No. 504 to No. 509 and No. 514). That is to say, the Erichsen values were evaluated for the plate materials (finishing cold rolling was done to be 0.40 mm thickness after having annealing at 630° C. for an hour) by Erichsen test. The results were listed in table 5 to table 8.

As seen in table 5 to table 8, it was apparent that the comparative example alloy materials of No. 501 to No. 515 were not suitable for any components of heat exchanger tube of heat exchanger, fin, body panel and flange etc. because there was at least one problem found in either 0.2% proof stress, extrusion characteristics, bending characteristics or formability. It is, however, confirmed that every single alloy from the first invention alloy materials of No. 101 to No. 114, the second invention alloy materials of No. 201 to No. 217, the third invention alloy materials of No. 301 to No. 304 and the fourth invention alloy materials of No. 401 to No. 412 showed satisfactory characteristics in 0.2% proof stress, extrusion, bending and formability and was suitable for any components of heat exchanger tube of heat exchanger, fin, body panel, flange etc.

Furthermore, the thermal conductivity of the brazed materials was measured to confirm the thermal conductivity when used for the brazed products and parts for the pipe materials obtained from the first invention alloy materials of No. 101 to No. 114, the second invention alloy materials of No. 201 to No. 217, the third invention alloy materials of No. 301 to No. 304, the fourth invention alloy materials of No. 401 to No. 412 and the comparative example alloy materials of No. 501 to No. 515 (aside from No. 504 to No. 509 and No. 514 which were not able to be prepared for the pipe materials). In other words, the thermal conductivity was measured for the pipe materials (No. 101 to No. 114, No. 201 to No. 217, No. 301 to No. 304, No. 401 to No. 412, No. 501 to No. 503, No. 510 to No. 513 and No. 515) after heat-treated for brazing by being passed through continued heat treating furnace under the same condition as described earlier for furnace brazing (heat treated at 800° C. for 10 minutes and furnace cooling was done at the rate of 20° C./minute). As seen in the results listed in table 5 to table 8, the superior thermal conductivity was confirmed, because all of the first invention alloy materials of No. 101 to No. 114, the second invention alloy materials of No. 201 to No. 217, the third invention alloy materials of No. 301 to No. 304 and the fourth invention alloy materials of No. 401 to No. 412 had satisfactory thermal conductivity of 0.65 cal/cm·sec·° C. or higher.

And, in order to confirm the effect of improving the thermal conductivity obtained by the first after-treatment, the second after-treatment or the third after-treatment after brazing process or heat treatment under equivalent condition, the thermal conductivity and proof stress were measured for the provided pipe materials of the first invention alloy materials of No. 101 to No. 114, the second invention alloy materials of No. 201 to No. 217, the third invention alloy materials of No. 301 to No. 304 and the fourth invention alloy materials of No. 401 to No. 412 after those after-treatments for each alloy were completed. In other words, each pipe material of No. 101 to No. 114, No. 201 to No. 217, No. 301 to No. 304 and No. 401 to No. 412 was heated under the same condition as described earlier for the brazing condition (heat temperature: 800° C., heating time: 10 minutes), and such heat-treated pipe materials (hereinafter called "heated pipe materials") were treated by the first after-treatment, the second after-treatment or the third after-treatment as follows. In the first after-treatment, the cooling rate from 670° C. to 480° C. through furnace cooling process for the heated pipe materials was decelerated to 4° C./minute. In addition, the furnace cooling rate from 800° C. to 670° C. and from 480° C. to room-temperature was 20° C./minute. Additionally, in the second after-treatment, furnace cooling was done for the heated pipe materials at the rate of 20° C./minute to become room-temperature and then re-heating was done at 580° C. for 30 minutes. Furthermore, in the second after-treatment, the rate of furnace cooling after the re-heating was 20° C./minutes. And in the third after-treatment, the heated pipe materials were water-cooled (quenched) and re-heated at 580° C. for 30 minutes in the same manner as the second after-treatment. The thermal conductivity after those heat treatments was listed in table 5 to table 7.

In addition, about the heated pipe materials of No. 104, No. 111, No. 210, No. 212, No. 215, No. 217, No. 301, No. 402, No. 406 and No. 408, the first to the third after-treatments were done under several different conditions, and the thermal conductivity after those heat treatments under each condition was measured. That is to say, in the first after-treatment, the thermal conductivity tests were performed at the rate of 4° C./minute from 670° C. to 480° C. as already described, as well as at the rate of 1.8° C./minute, 2.5° C./minute, 6° C./minute, 10° C./minute and 12° C./minute. And then, in the second after-treatment and the third after-treatment, the tests were performed for not only the re-heating conditions of 580° C. for 30 minute which was described above, but also 480° C. for 100 minute, 520° C. for 50 minute, 580° C. for 10 minute, 580° C. for 50 minute, 640° C. for 30 minute, 640° C. for 10 minute and 670° C. for 3 minute. The thermal conductivity obtained from each case was summarized in table 9 to table 11.

And, for the cases of re-heating condition of 520° C. for 50 minute, 580° C. for 30 minute and 640° C. for 30 minute, out of those tested after the second after-treatment and the third after-treatment, the strength of 0.2% proof stress was measured by tensile test with AMSLER universal testing machine. The results were listed in table 12.

Furthermore, among the provided pipe materials having 10 mm outside diameter and 1 mm wall thickness as described above, No. 104, No. 111, No. 210, No. 212, No. 215, No. 217, No. 301, No. 402, No. 406, No. 408 as well as the comparative No. 501, No. 503 and No. 512 were tested as follows to evaluate corrosion resistance.

At first, each pipe material was heat-treated under the same condition as the heat-treatment of brazing as previously described, and flat test pieces were prepared by flattening the heat-treated pipe materials to be 4 mm thickness. And, firstly, the following test on stress corrosion cracking was performed for each test piece. In other words, each test piece was put in the desiccator containing 12% of ammonium hydroxide to be exposed to the ammonia vapor for 48 hours and then each length of the stress cracking appeared on the test piece was measured. The stress corrosion cracks appeared on the outer and inner sides of the longitudinal section in the flattest part of the test piece where the curvature was the smallest were observed by microscope and then the length of each crack was measured. The length of stress corrosion crack (mm) was indicated as the sum of the longest length each from the outer and inner sides. Secondly, each flatten test piece was adjusted so that every piece had the surface area of 100 cm$^2$. Those pieces were then dipped into either 1 litter of 1% sulfuric acid solution or 1 litter of 1% hydrochloric acid solution, both of which were pre-heated to 75° C., for 48 hours. The weight difference of the flatten test piece between before and after-dipping, i.e. the loss in quantity by the dissolution (mg), was measured. The results were listed in table 13.

As understood by table 5 to table 7 and table 9 to table 12, in the cases where the heat-treated pipe materials were treated by the first to the third after-treatments, the thermal conductivity was improved significantly comparing to the materials only with the heat treatment of brazing and it was confirmed that the thermal conductivity could be significantly improved by the first to the third heat-treatments. Additionally, both improvements of the thermal conductivity in the second and third after-treatment were observed to be at the same level. In the case that the re-heating process was given, cooling rate of the heat-treated pipe materials showed no effect on the improvement of thermal conductivity, and it was confirmed that the improvement of thermal conductivity depended on the condition when re-heated. In particular, when the third after-treatment was given, as apparent from table 12, not only thermal conductivity but also strength (0.2% proof stress) was improved, which proved that the quenching at high cooling rate was effective to improve the strength.

And, as apparent from the table 13, comparing to the comparative example alloy materials of No. 501, No. 503 and No. 512, the invention alloy materials of No. 104, No. 111, No. 210, No. 212, No. 215, No. 217, No. 301, No. 402, No. 406 and No. 408 showed extremely short length of stress corrosion cracking and small loss in quantity by the dissolution in 1% sulfuric acid and 1% hydrochloric acid solutions. According to those points, it was understood that the alloy materials of the present invention could prevent stress corrosion cracking, pitting corrosion and localized corrosion caused by the grain growth from occurring and were also superior in corrosion resistance.

TABLE 1

| | | Alloy No. | Alloy composition (mass %) | | | | | | | | | | | | |
|---|---|---|---|---|---|---|---|---|---|---|---|---|---|---|---|
| | | | Co | P | Sn | Zn | Ni | Fe | Mn | Mg | Zr | Y | A1 | A2 | A3 |
| Embodiment | First Invention Alloy Material | 101 | 0.22 | 0.059 | 0.13 | 0.21 | | | | | | | 3.39 | 0.39 | — |
| | | 102 | 0.15 | 0.049 | 0.05 | 0.03 | | | | | | | 2.65 | 0.22 | — |
| | | 103 | 0.21 | 0.066 | 0.23 | 0.25 | | | | | | | 2.88 | 0.48 | — |
| | | 104 | 0.24 | 0.069 | 0.07 | 0.08 | | | | | | | 3.19 | 0.35 | — |
| | | 105 | 0.18 | 0.042 | 0.06 | 0.08 | | | | | | | 3.81 | 0.26 | — |
| | | 106 | 0.20 | 0.057 | 0.10 | 0.11 | | | | | | | 3.16 | 0.33 | — |
| | | 107 | 0.19 | 0.055 | 0.08 | 0.08 | | | | | | | 3.09 | 0.30 | — |
| | | 108 | 0.22 | 0.060 | 0.05 | 0.03 | | | | | | | 3.33 | 0.30 | — |
| | | 109 | 0.17 | 0.048 | 0.15 | 0.12 | | | | | | | 3.13 | 0.34 | — |
| | | 110 | 0.29 | 0.070 | 0.11 | 0.25 | | | | | | | 3.86 | 0.45 | — |
| | | 111 | 0.28 | 0.064 | 0.04 | 0.05 | | | | | | | 4.06 | 0.35 | — |
| | | 112 | 0.22 | 0.082 | 0.07 | 0.21 | | | | | | | 2.44 | 0.35 | — |
| | | 113 | 0.24 | 0.043 | 0.12 | 0.14 | | | | | | | 5.12 | 0.38 | — |
| | | 114 | 0.31 | 0.075 | 0.14 | 0.31 | | | | | | | 3.87 | 0.50 | — |

A1 = ([Co] + 0.8[Ni] + 0.8[Fe] − 0.02)/[P]
A2 = [Co] + 0.5[P] + 0.9[Sn] + 0.1[Zn] + 0.9[Ni] + 1.5[Fe] + [Mn] + [Mg] + [Y] + 3[Zr]
A3 = [Co] + 0.8[Ni] + 0.8[Fe]

TABLE 2

| | | Alloy No. | Alloy composition (mass %) | | | | | | | | | | | | |
|---|---|---|---|---|---|---|---|---|---|---|---|---|---|---|---|
| | | | Co | P | Sn | Zn | Ni | Fe | Mn | Mg | Zr | Y | A1 | A2 | A3 |
| Embodiment | Second Invention Alloy Material | 201 | 0.12 | 0.048 | 0.05 | 0.14 | 0.04 | | | | | | 2.75 | 0.24 | 0.15 |
| | | 202 | 0.24 | 0.070 | 0.09 | 0.08 | 0.02 | | | | | | 3.37 | 0.38 | 0.26 |
| | | 203 | 0.16 | 0.056 | 0.02 | 0.17 | 0.03 | | | | | | 2.93 | 0.25 | 0.18 |
| | | 204 | 0.15 | 0.047 | 0.23 | 0.13 | 0.12 | | | | | | 4.81 | 0.50 | 0.25 |
| | | 205 | 0.21 | 0.064 | 0.12 | 0.11 | 0.04 | | | | | | 3.47 | 0.40 | 0.24 |
| | | 206 | 0.19 | 0.060 | 0.09 | 0.07 | 0.03 | | | | | | 3.23 | 0.34 | 0.21 |
| | | 207 | 0.17 | 0.056 | 0.07 | 0.05 | 0.03 | | | | | | 3.11 | 0.29 | 0.19 |
| | | 208 | 0.16 | 0.068 | 0.07 | 0.25 | 0.12 | | | | | | 3.47 | 0.39 | 0.26 |
| | | 209 | 0.18 | 0.071 | 0.18 | 0.29 | 0.08 | | | | | | 3.15 | 0.48 | 0.24 |
| | | 210 | 0.25 | 0.072 | 0.08 | 0.06 | 0.10 | | | | | | 4.31 | 0.45 | 0.33 |
| | | 211 | 0.24 | 0.074 | 0.16 | 0.15 | 0.10 | | | | | | 4.05 | 0.53 | 0.32 |
| | | 212 | 0.20 | 0.066 | 0.07 | 0.03 | 0.07 | | | | | | 3.58 | 0.36 | 0.26 |
| | | 213 | 0.21 | 0.065 | 0.08 | 0.11 | | 0.04 | | | | | 3.42 | 0.39 | 0.24 |
| | | 214 | 0.19 | 0.075 | 0.04 | 0.30 | | 0.09 | | | | | 3.23 | 0.43 | 0.26 |
| | | 215 | 0.22 | 0.074 | 0.05 | 0.05 | | 0.13 | | | | | 4.11 | 0.50 | 0.32 |
| | | 216 | 0.21 | 0.070 | 0.10 | 0.08 | 0.06 | 0.03 | | | | | 3.74 | 0.44 | 0.28 |
| | | 217 | 0.17 | 0.066 | 0.08 | 0.14 | 0.02 | 0.09 | | | | | 3.61 | 0.44 | 0.26 |

A1 = ([Co] + 0.8[Ni] + 0.8[Fe] − 0.02)/[P]
A2 = [Co] + 0.5[P] + 0.9[Sn] + 0.1[Zn] + 0.9[Ni] + 1.5[Fe] + [Mn] + [Mg] + [Y] + 3[Zr]
A3 = [Co] + 0.8[Ni] + 0.8[Fe]

TABLE 3

| | | Alloy No. | Alloy composition (mass %) | | | | | | | | | | | | |
|---|---|---|---|---|---|---|---|---|---|---|---|---|---|---|---|
| | | | Co | P | Sn | Zn | Ni | Fe | Mn | Mg | Zr | Y | A1 | A2 | A3 |
| Embodiment | Third Invention Alloy Material | 301 | 0.27 | 0.068 | 0.06 | 0.08 | | | 0.06 | | | | 3.68 | 0.40 | 0.27 |
| | | 302 | 0.20 | 0.058 | 0.08 | 0.06 | | | | 0.005 | | | 3.10 | 0.31 | 0.20 |
| | | 303 | 0.18 | 0.050 | 0.12 | 0.10 | | | | | 0.004 | | 3.20 | 0.33 | 0.18 |
| | | 304 | 0.23 | 0.066 | 0.07 | 0.06 | | | | | | 0.013 | 3.18 | 0.35 | 0.23 |
| | Fourth Invention Alloy material | 401 | 0.22 | 0.070 | 0.05 | 0.13 | 0.05 | | 0.11 | | | | 3.43 | 0.41 | 0.26 |
| | | 402 | 0.20 | 0.068 | 0.06 | 0.15 | | 0.05 | 0.05 | | | | 3.24 | 0.40 | 0.24 |
| | | 403 | 0.19 | 0.072 | 0.12 | 0.15 | 0.04 | 0.04 | 0.02 | | | | 3.25 | 0.46 | 0.25 |
| | | 404 | 0.20 | 0.070 | 0.15 | 0.30 | 0.06 | | | 0.002 | | | 3.26 | 0.46 | 0.25 |
| | | 405 | 0.18 | 0.073 | 0.05 | 0.22 | | 0.07 | | 0.009 | | | 2.96 | 0.40 | 0.24 |
| | | 406 | 0.16 | 0.073 | 0.09 | 0.08 | 0.03 | 0.07 | | 0.046 | | | 3.01 | 0.46 | 0.24 |

TABLE 3-continued

| Alloy | Alloy composition (mass %) | | | | | | | | | | | | |
|---|---|---|---|---|---|---|---|---|---|---|---|---|---|
| No. | Co | P | Sn | Zn | Ni | Fe | Mn | Mg | Zr | Y | A1 | A2 | A3 |
| 407 | 0.17 | 0.065 | 0.11 | 0.10 | 0.10 | | | | 0.007 | | 3.54 | 0.42 | 0.25 |
| 408 | 0.20 | 0.065 | 0.08 | 0.15 | | 0.05 | | | 0.016 | | 3.38 | 0.43 | 0.24 |
| 409 | 0.18 | 0.071 | 0.12 | 0.03 | 0.07 | 0.02 | | | 0.001 | | 3.27 | 0.42 | 0.25 |
| 410 | 0.19 | 0.058 | 0.06 | 0.13 | 0.02 | | | | | 0.044 | 3.21 | 0.35 | 0.21 |
| 411 | 0.24 | 0.075 | 0.08 | 0.21 | 0.03 | | | | | 0.005 | 3.25 | 0.40 | 0.26 |
| 412 | 0.16 | 0.063 | 0.10 | 0.16 | 0.01 | 0.07 | | | | 0.002 | 3.24 | 0.41 | 0.22 |

A1 = ([Co] + 0.8[Ni] + 0.8[Fe] − 0.02)/[P]
A2 = [Co] + 0.5[P] + 0.9[Sn] + 0.1[Zn] + 0.9[Ni] + 1.5[Fe] + [Mn] + [Mg] + [Y] + 3[Zr]
A3 = [Co] + 0.8[Ni] + 0.8[Fe]

TABLE 4

| | Alloy | Alloy composition (mass %) | | | | | | | | | | | | |
|---|---|---|---|---|---|---|---|---|---|---|---|---|---|---|
| | No. | Co | P | Sn | Zn | Ni | Fe | Mn | Mg | Zr | Y | A1 | A2 | A3 |
| Comparative example | 501 | | 0.031 | | | | | | | | | — | 0.02 | — |
| | 502 | | 0.052 | | | | | | | | | — | 0.03 | — |
| | 503 | 0.16 | 0.043 | | | | | | | | | 3.26 | 0.18 | — |
| | 504 | 0.38 | 0.079 | 0.11 | 0.09 | | | | | | | 4.56 | 0.53 | — |
| | 505 | 0.22 | 0.062 | 0.29 | 0.23 | | | | | | | 3.23 | 0.54 | — |
| | 506 | 0.32 | 0.077 | 0.24 | 0.16 | | | | | | | 3.90 | 0.59 | — |
| | 507 | 0.29 | 0.078 | 0.16 | 0.26 | 0.10 | | | | | | 4.49 | 0.59 | 0.37 |
| | 508 | 0.24 | 0.070 | 0.25 | 0.75 | | | | | | | 3.14 | 0.58 | — |
| | 509 | 0.23 | 0.078 | 0.20 | 0.08 | 0.15 | | | | | | 4.23 | 0.59 | 0.35 |
| | 510 | 0.25 | 0.041 | 0.10 | 0.08 | | | | | | | 5.61 | 0.37 | — |
| | 511 | 0.16 | 0.087 | 0.11 | 0.14 | | | | | | | 1.61 | 0.32 | — |
| | 512 | 0.12 | 0.045 | 0.08 | 0.12 | 0.13 | | | | | | 4.53 | 0.34 | 0.22 |
| | 513 | 0.12 | 0.044 | 0.12 | 0.14 | 0.02 | | | | | | 2.64 | 0.28 | 0.14 |
| | 514 | 0.28 | 0.079 | 0.15 | 0.21 | 0.13 | | | | | | 4.61 | 0.59 | 0.38 |
| | 515 | 0.36 | 0.080 | 0.13 | 0.03 | | | | | | | 4.25 | 0.52 | — |

A1 = ([Co] + 0.8[Ni] + 0.8[Fe] − 0.02)/[P]
A2 = [Co] + 0.5[P] + 0.9[Sn] + 0.1[Zn] + 0.9[Ni] + 1.5[Fe] + [Mn] + [Mg] + [Y] + 3[Zr]
A3 = [Co] + 0.8[Ni] + 0.8[Fe]

TABLE 5

| | | Alloy No. | 0.2% proof stress (N/mm$^2$) | Extrusion characteristics | Bending characteristics | Formability Erichsen value (mm) | Thermal conductivity after heat treatment (cal/cm · sec · ° C.) | | | |
|---|---|---|---|---|---|---|---|---|---|---|
| | | | | | | | Brazing heat treatment | First after-treatment | Second after-treatment | Third after-treatment |
| Embodiment | First Invention Alloy Material | 101 | 107 | ○ | ○ | 12.1 | 0.69 | 0.72 | 0.73 | 0.73 |
| | | 102 | 59 | ○ | ○ | 12.3 | 0.69 | 0.72 | 0.72 | 0.73 |
| | | 103 | 112 | Δ | Δ | 11.6 | 0.67 | 0.69 | 0.69 | 0.69 |
| | | 104 | 110 | ○ | ○ | 12.1 | 0.71 | 0.74 | 0.74 | 0.73 |
| | | 105 | 61 | ○ | ○ | 12.3 | 0.71 | 0.74 | 0.75 | 0.74 |
| | | 106 | 101 | ○ | ○ | 12.1 | 0.71 | 0.73 | 0.74 | 0.73 |
| | | 107 | 91 | ○ | ○ | 12.2 | 0.72 | 0.75 | 0.76 | 0.75 |
| | | 108 | 96 | ○ | ○ | 12.2 | 0.72 | 0.75 | 0.75 | 0.74 |
| | | 109 | 90 | ○ | ○ | 12.0 | 0.70 | 0.72 | 0.73 | 0.73 |
| | | 110 | 118 | ○ | Δ | 11.8 | 0.68 | 0.71 | 0.72 | 0.71 |
| | | 111 | 110 | ○ | ○ | 12.2 | 0.69 | 0.73 | 0.73 | 0.72 |
| | | 112 | 94 | ○ | ○ | 12.0 | 0.66 | 0.70 | 0.71 | 0.70 |
| | | 113 | 69 | ○ | ○ | 11.9 | 0.66 | 0.69 | 0.71 | 0.70 |
| | | 114 | 123 | Δ | Δ | 11.5 | 0.67 | 0.70 | 0.70 | 0.70 |

TABLE 6

| | | Alloy No. | 0.2% proof stress (N/mm²) | Extrusion characteristics | Bending characteristics | Formability Erichsen value (mm) | Thermal conductivity after heat treatment (cal/cm · sec · °C.) | | | |
|---|---|---|---|---|---|---|---|---|---|---|
| | | | | | | | Brazing heat treatment | First after-treatment | Second after-treatment | Third after-treatment |
| Embodiment | Second Invention Alloy Material | 201 | 57 | ○ | ○ | 12.3 | 0.70 | 0.73 | 0.75 | 0.74 |
| | | 202 | 110 | ○ | ○ | 12.2 | 0.70 | 0.73 | 0.74 | 0.74 |
| | | 203 | 72 | ○ | ○ | 12.3 | 0.71 | 0.74 | 0.76 | 0.75 |
| | | 204 | 74 | Δ | Δ | 11.6 | 0.65 | 0.68 | 0.68 | 0.68 |
| | | 205 | 105 | ○ | ○ | 12.0 | 0.69 | 0.71 | 0.72 | 0.72 |
| | | 206 | 94 | ○ | ○ | 12.2 | 0.70 | 0.73 | 0.73 | 0.73 |
| | | 207 | 82 | ○ | ○ | 12.2 | 0.70 | 0.73 | 0.74 | 0.73 |
| | | 208 | 96 | ○ | ○ | 12.0 | 0.69 | 0.72 | 0.73 | 0.73 |
| | | 209 | 105 | ○ | Δ | 11.7 | 0.67 | 0.70 | 0.70 | 0.70 |
| | | 210 | 113 | ○ | Δ | 11.6 | 0.67 | 0.71 | 0.71 | 0.71 |
| | | 211 | 115 | Δ | Δ | 11.5 | 0.65 | 0.68 | 0.68 | 0.67 |
| | | 212 | 101 | ○ | ○ | 12.2 | 0.70 | 0.73 | 0.74 | 0.74 |
| | | 213 | 100 | ○ | ○ | 12.1 | 0.69 | 0.72 | 0.72 | 0.72 |
| | | 214 | 102 | ○ | ○ | 12.0 | 0.68 | 0.72 | 0.72 | 0.72 |
| | | 215 | 111 | Δ | Δ | 11.7 | 0.65 | 0.69 | 0.70 | 0.70 |
| | | 216 | 104 | ○ | ○ | 12.0 | 0.68 | 0.70 | 0.71 | 0.70 |
| | | 217 | 99 | ○ | ○ | 11.9 | 0.68 | 0.71 | 0.71 | 0.71 |

TABLE 7

| | | Alloy No. | 0.2% proof stress (N/mm²) | Extrusion characteristics | Bending characteristics | Formability Erichsen value (mm) | Thermal conductivity after heat treatment (cal/cm · sec · °C.) | | | |
|---|---|---|---|---|---|---|---|---|---|---|
| | | | | | | | Brazing heat treatment | First after-treatment | Second after-treatment | Third after-treatment |
| Embodiment | Third Invention Alloy Material | 301 | 109 | ○ | ○ | 12.0 | 0.66 | 0.69 | 0.70 | 0.70 |
| | | 302 | 94 | ○ | ○ | 12.2 | 0.70 | 0.73 | 0.73 | 0.72 |
| | | 303 | 90 | ○ | ○ | 12.1 | 0.69 | 0.71 | 0.72 | 0.72 |
| | | 304 | 100 | ○ | ○ | 12.1 | 0.70 | 0.73 | 0.73 | 0.73 |
| | Fourth Invention Alloy Material | 401 | 105 | ○ | ○ | 12.1 | 0.67 | 0.70 | 0.71 | 0.71 |
| | | 402 | 98 | ○ | ○ | 12.0 | 0.68 | 0.71 | 0.72 | 0.72 |
| | | 403 | 102 | ○ | ○ | 12.0 | 0.68 | 0.70 | 0.71 | 0.70 |
| | | 404 | 104 | ○ | ○ | 12.0 | 0.67 | 0.69 | 0.69 | 0.68 |
| | | 405 | 100 | ○ | ○ | 12.1 | 0.69 | 0.72 | 0.72 | 0.72 |
| | | 406 | 95 | ○ | ○ | 12.0 | 0.67 | 0.70 | 0.71 | 0.71 |
| | | 407 | 98 | ○ | ○ | 12.0 | 0.68 | 0.71 | 0.70 | 0.70 |
| | | 408 | 102 | ○ | ○ | 12.0 | 0.68 | 0.72 | 0.71 | 0.71 |
| | | 409 | 106 | ○ | ○ | 12.0 | 0.67 | 0.70 | 0.71 | 0.71 |
| | | 410 | 85 | ○ | ○ | 12.2 | 0.68 | 0.71 | 0.72 | 0.71 |
| | | 411 | 111 | ○ | ○ | 12.1 | 0.69 | 0.72 | 0.72 | 0.72 |
| | | 412 | 97 | ○ | ○ | 12.0 | 0.68 | 0.70 | 0.71 | 0.70 |

TABLE 8

| | Alloy No. | 0.2% proof stress (N/mm²) | Extrusion characteristics | Bending characteristics | Formability Erichsen value (mm) | Thermal conductivity after heat treatment for brazing (cal/cm · sec · °C.) |
|---|---|---|---|---|---|---|
| Comparative example | 501 | 25 | ○ | ○ | 12.3 | 0.78 |
| | 502 | 29 | ○ | ○ | 12.1 | 0.64 |
| | 503 | 43 | ○ | ○ | 12.2 | 0.73 |
| | 504 | — | X | — | — | — |
| | 505 | — | X | — | — | — |
| | 506 | — | X | — | — | — |
| | 507 | — | X | — | — | — |
| | 508 | — | X | — | — | — |
| | 509 | — | X | — | — | — |
| | 510 | 49 | ○ | Δ | 11.8 | 0.62 |
| | 511 | 52 | ○ | X | 11.5 | 0.59 |

TABLE 8-continued

| Alloy No. | 0.2% proof stress (N/mm²) | Extrusion characteristics | Bending characteristics | Formability Erichsen value (mm) | Thermal conductivity after heat treatment for brazing (cal/cm · sec · ° C.) |
|---|---|---|---|---|---|
| 512 | 48 | ○ | ○ | 12.0 | 0.62 |
| 513 | 43 | ○ | ○ | 12.3 | 0.67 |
| 514 | — | X | — | — | — |
| 515 | 119 | Δ | X | 11.3 | 0.62 |

TABLE 9

Thermal conductivity after heat treatment (cal/cm · sec · ° C.)

| | Alloy No. | Brazing heat treatment | First after-treatment (cooling rate) | | | | | |
|---|---|---|---|---|---|---|---|---|
| | | | 1.8° C./min. | 2.5° C./min. | 4° C./min. | 6° C./min. | 10° C./min. | 12° C./min. |
| Embodiment | 104 | 0.71 | 0.74 | 0.74 | 0.74 | 0.74 | 0.73 | 0.72 |
| | 111 | 0.69 | 0.74 | 0.74 | 0.73 | 0.73 | 0.72 | 0.71 |
| | 210 | 0.67 | 0.72 | 0.72 | 0.71 | 0.71 | 0.71 | 0.69 |
| | 212 | 0.70 | 0.74 | 0.74 | 0.73 | 0.72 | 0.72 | 0.71 |
| | 215 | 0.65 | 0.70 | 0.70 | 0.69 | 0.69 | 0.68 | 0.67 |
| | 217 | 0.68 | 0.72 | 0.72 | 0.71 | 0.71 | 0.70 | 0.69 |
| | 301 | 0.66 | 0.71 | 0.71 | 0.69 | 0.69 | 0.68 | 0.67 |
| | 402 | 0.68 | 0.72 | 0.71 | 0.71 | 0.70 | 0.70 | 0.69 |
| | 406 | 0.67 | 0.71 | 0.71 | 0.70 | 0.70 | 0.69 | 0.69 |
| | 408 | 0.68 | 0.74 | 0.73 | 0.72 | 0.71 | 0.70 | 0.69 |

TABLE 10

Thermal conductivity after second after-treatment (cal/cm · sec · ° C.)
Re-heating condition of second after-treatment

| | Alloy No. | 480° C. × 100 min. | 520° C. × 50 min. | 580° C. × 10 min. | 580° C. × 30 min. | 580° C. × 50 min. | 640° C. × 30 min. | 640° C. × 10 min. | 670° C. × 3 min. |
|---|---|---|---|---|---|---|---|---|---|
| Embodiment | 104 | 0.72 | 0.74 | 0.73 | 0.74 | 0.75 | 0.73 | 0.73 | 0.72 |
| | 111 | 0.71 | 0.72 | 0.72 | 0.73 | 0.74 | 0.73 | 0.72 | 0.71 |
| | 210 | 0.69 | 0.71 | 0.70 | 0.71 | 0.72 | 0.71 | 0.71 | 0.69 |
| | 212 | 0.72 | 0.73 | 0.72 | 0.74 | 0.74 | 0.73 | 0.72 | 0.72 |
| | 215 | 0.68 | 0.70 | 0.68 | 0.70 | 0.72 | 0.71 | 0.69 | 0.67 |
| | 217 | 0.69 | 0.71 | 0.70 | 0.71 | 0.72 | 0.71 | 0.70 | 0.69 |
| | 301 | 0.68 | 0.69 | 0.69 | 0.70 | 0.71 | 0.70 | 0.69 | 0.68 |
| | 402 | 0.70 | 0.71 | 0.70 | 0.72 | 0.72 | 0.72 | 0.71 | 0.70 |
| | 406 | 0.69 | 0.70 | 0.70 | 0.71 | 0.71 | 0.71 | 0.70 | 0.69 |
| | 408 | 0.70 | 0.72 | 0.70 | 0.71 | 0.73 | 0.71 | 0.71 | 0.69 |

TABLE 11

Thermal conductivity after third after-treatment (cal/cm · sec · ° C.)
Re-heating condition of third after-treatment

| | Alloy No. | 480° C. × 100 min. | 520° C. × 50 min. | 580° C. × 10 min. | 580° C. × 30 min. | 580° C. × 50 min. | 640° C. × 30 min. | 640° C. × 10 min. | 670° C. × 3 min. |
|---|---|---|---|---|---|---|---|---|---|
| Embodiment | 104 | 0.72 | 0.72 | 0.69 | 0.73 | 0.76 | 0.74 | 0.71 | 0.70 |
| | 111 | 0.72 | 0.71 | 0.69 | 0.72 | 0.75 | 0.73 | 0.70 | 0.69 |
| | 210 | 0.69 | 0.70 | 0.68 | 0.71 | 0.73 | 0.72 | 0.71 | 0.68 |
| | 212 | 0.70 | 0.72 | 0.70 | 0.74 | 0.75 | 0.73 | 0.70 | 0.68 |
| | 215 | 0.67 | 0.70 | 0.66 | 0.70 | 0.73 | 0.71 | 0.68 | 0.66 |
| | 217 | 0.69 | 0.71 | 0.70 | 0.71 | 0.73 | 0.70 | 0.70 | 0.67 |
| | 301 | 0.67 | 0.69 | 0.67 | 0.70 | 0.72 | 0.71 | 0.68 | 0.66 |
| | 402 | 0.70 | 0.71 | 0.70 | 0.72 | 0.73 | 0.72 | 0.70 | 0.67 |
| | 406 | 0.68 | 0.70 | 0.68 | 0.71 | 0.72 | 0.71 | 0.69 | 0.66 |
| | 408 | 0.69 | 0.71 | 0.69 | 0.71 | 0.73 | 0.71 | 0.70 | 0.67 |

TABLE 12

| Alloy | 0.2% proof stress (N/mm²) | | | | | |
|---|---|---|---|---|---|---|
| | Second after-treatment (Re-heating condition) | | | Third after-treatment (Re-heating condition) | | |
| No. | 520° C. × 50 min. | 580° C. × 30 min. | 640° C. × 30 min. | 520° C. × 50 min. | 580° C. × 30 min. | 640° C. × 30 min. |
| Embodiment 104 | 114 | 118 | 112 | 116 | 122 | 115 |
| 111 | 116 | 119 | 113 | 121 | 123 | 117 |
| 210 | 117 | 123 | 114 | 119 | 126 | 115 |
| 212 | 103 | 106 | 101 | 107 | 110 | 106 |
| 215 | 116 | 115 | 112 | 120 | 121 | 115 |
| 217 | 103 | 104 | 100 | 106 | 106 | 103 |
| 301 | 115 | 117 | 112 | 121 | 123 | 119 |
| 402 | 104 | 103 | 100 | 107 | 109 | 103 |
| 406 | 97 | 99 | 96 | 104 | 104 | 101 |
| 408 | 107 | 108 | 103 | 110 | 110 | 105 |

TABLE 13

| | Alloy No. | Stress corrosion cracking length (mm) | Weight loss by dissolution (mg) | |
|---|---|---|---|---|
| | | | 1% sulfuric acid | 1% hydrochloric acid |
| Embodiment | 104 | 0.01 | 6.4 | 27 |
| | 111 | 0.01 | 6.6 | 27 |
| | 210 | 0.02 | 6.9 | 25 |
| | 212 | 0.01 | 6.5 | 26 |
| | 215 | 0.02 | 6.8 | 30 |
| | 217 | 0.03 | 7.3 | 28 |
| | 301 | 0.02 | 7.2 | 29 |
| | 402 | 0.03 | 7.5 | 32 |
| | 406 | 0.03 | 7.1 | 34 |
| | 408 | 0.03 | 7.2 | 33 |
| Comparative example | 501 | 0.45 | 10.5 | 48 |
| | 503 | 0.23 | 9.3 | 40 |
| | 512 | 0.20 | 8.6 | 38 |

INDUSTRIAL APPLICABILITY

The heat resistance copper alloy materials of the present invention can effectively prevent corrosion from happening such as stress corrosion cracking, pitting corrosion, and localized corrosion caused by the grain growth. Also its original inherent characteristics of copper alloy (thermal conductivity etc.) and proof stress are not lowered after the heat-treatment at 600 to 700° C. because crystal grains are not coarsened. Therefore, by the use of the heat resistance copper alloy materials of the present invention, the durability and useful life for a wide variety of parts and products, such as heat exchanger tube of heat exchanger, fin, body panel and flange, which are exposed to high temperatures of not less than 600 to 700° C. during production or application (heated to around 800° C. by brazing, for example) can be significantly improved comparing to those made of the general phosphorus deoxidized copper. Also the heat exchanger tubes etc., showing satisfactory corrosion resistance even under the conditions where stress corrosion cracking, pitting corrosion and localized corrosion are easily produced, can be provided. In particular, the pipe materials are suitable for the component of heat exchanger tube of heat exchanger employing heat medium gas aside from HCFC system fluorocarbon, and the large expansion in use can be expected comparing to the conventional heat resistance copper alloy materials. In addition, the plate materials are suitable for the component of the fins installed to heat exchanger tubes of hot-water supply system and air conditioner etc., as a solution to the problems often found with the conventional heat resistant copper alloy (for example, a fin is easily deformed by small external forces while cleaning and as a result, thermal efficiency of heat exchanger is lost in great deal), resulting in the improvement of efficiency and durability of the products and parts. As thus described, according to the present invention, heat resistance copper alloy materials can be offered as preferably used for the heat exchangers of instantaneous water heater, hot-water supply system, warm water device, air conditioner, refrigerator, radiator as well as the heat exchanger tubes or pipes equipped in heat exchangers for hot water system, air conditioning system, refrigeration system etc. (water supply pipe, hot water supply pipe and gas piping), the piping of other various machinery (electric or chemical devices), or as the materials suitable for tube; board, bar, wire rod, or worked materials (machined into pre-determined shapes by brazing, welding, cutting or pressing) composing the accessory parts and machinery for the above-mentioned products (heating-cooling four-way switching valve etc.).

The invention claimed is:

1. A heat resistance copper alloy material, comprising:
0.11 to 0.31 mass percent of Co;
0.041 to 0.089 mass percent of P;
0.02 to 0.25 mass percent of Sn;
0.01 to 0.40 mass percent of Zn;
0.01 to 0.17 mass percent of Ni, or 0.01 to 0.15 mass percent of Fe, or 0.01 to 0.17mass percent of Ni and 0.01 to 0.15 mass percent of Fe; and
the remaining mass percent of Cu and inevitable impurities,
wherein each content of Co, P, Sn, Zn, Ni and Fe satisfies the relationships $2.4 \leq ([Co]+0.8[Ni]+0.8[Fe]-0.02)/[P] \leq 5.2$;

$0.20 \leq [Co]+0.5[P]+0.9[Sn]+0.1[Zn]+0.9[Ni]+1.5[Fe] \leq 0.54$;

$0.15 \leq [Co]+0.8[Ni]+0.8[Fe] \leq 0.35$;

$1.2[Ni] < [Co]$;

$1.5[Fe] < [Co]$; and $[Ni]+[Fe] < [Co]$, wherein [Co], [P], [Sn], [Zn], [Ni] and [Fe] are said mass percents of Co, P, Sn, Zn, Ni and Fe content, respectively, wherein said copper alloy material is a pipe, plate, bar, wire or worked material obtained by working said pipe, plate, bar or wire material into predetermined shapes, and wherein 0.2% proof stress of said copper alloy material is higher than or equal to 55 N/mm² after a brazing treatment at about 800° C.

2. The heat resistance copper alloy material according to claim 1, further comprising 0.01 to 0.20 mass percent of Mn or 0.001 to 0.10 mass percent of Mg, Zr or Y, wherein each content of Mn, Mg, Y, Zr and said added elements satisfies the relationship $$0.20 \leq [Co]+0.5[P]+0.9[Sn]+0.1[Zn]+0.9[Ni]+1.5[Fe]+[Mn]+[Mg]+[Y]+3[Zr] \leq 0.54,$$

wherein [Mn], [Mg], [Y] and [Zr] are said mass percents of Mn, Mg, Y and Zr content, respectively.

3. The heat resistance copper alloy material according to claim 2, wherein content of oxygen as said inevitable impurity is less than or equal to 0.0070mass percent.

4. The heat resistance copper alloy material according to claim 2, wherein a furnace cooling of said copper alloy material is performed after a brazing treatment or a heat treatment under the same condition as said brazing treatment, and the thermal conductivity is raised by cooling from 670° C. to 480° C. with a cooling rate of 1.5 to 12° C./min in said furnace cooling process.

5. The heat resistance copper alloy material according to claim 2, wherein said copper alloy material is quenched after a brazing treatment or a heat treatment under the same condition as said brazing treatment, and the thermal conductivity and strength are raised by performing re-heating treatment in which said copper alloy material is heated under conditions with temperature of 480° C. to 670° C. for 3 to 100 minutes after said quenching has been finished.

6. The heat resistance copper alloy material according to claim 2, wherein said copper alloy material is a pipe, plate, bar, wire or worked material obtained by working said pipe, plate, bar or wire material into predetermined shapes to be brazed.

7. The heat resistance copper alloy material according to claim 6, wherein said copper alloy material is a seamless copper alloy tube or a welded copper alloy tube to be used as a heat exchanger tube or a piping tube of a heat exchanger.

8. The heat resistance copper alloy material according to claim 1, wherein a furnace cooling of said copper alloy material is performed after a brazing treatment or a heat treatment under the same condition as said brazing treatment, and the thermal conductivity is raised by cooling from 670° C. to 480° C. with a cooling rate of 1.5 to 12° C./min in said furnace cooling process.

9. The heat resistance copper alloy material according to claim 1, wherein a furnace cooling of said copper alloy material is performed after a brazing treatment or a heat treatment under the same condition as said brazing treatment, and the thermal conductivity is raised by performing re-heating treatment in which said copper alloy material is heated under conditions with temperature of 480° C. to 670° C. for 3 to 100minutes before or after said furnace cooling process has been finished.

10. The heat resistance copper alloy material according to claim 1, wherein said copper alloy material is quenched after a brazing treatment or a heat treatment under the same condition as said brazing treatment, and the thermal conductivity and strength are raised by performing re-heating treatment in which said copper alloy material is heated under conditions with temperature of 480° C. to 670° C. for 3 to 100 minutes after said quenching has been finished.

11. The heat resistance copper alloy material according to claim 1, wherein said copper alloy material is a pipe, plate, bar, wire or worked material obtained by working said pipe, plate, bar or wire material into predetermined shapes to be brazed.

12. The heat resistance copper alloy material according to claim 11, wherein said copper alloy material is a seamless copper alloy tube or a welded copper alloy tube to be used as a heat exchanger tube or a piping tube of a heat exchanger.

13. The heat resistance copper alloy material according to claim 11, wherein said copper alloy material is a seamless copper alloy tube or a welded copper tube composing a heat exchanger tube or a piping tube of a heat exchanger using a heat medium gas aside from HCFC system fluorocarbon.

14. The heat resistance copper alloy material according to claim 11, wherein said copper alloy material is a plate part in a heat exchanger or a plate used as a component of connecting plate which couples said plate part with said heat exchanger tube or other plate parts.

15. The heat resistance copper alloy material according to claim 1, wherein thermal conductivity of said copper alloy material is higher than or equal to 0.65 cal/cm·sec·° C.

16. The heat resistance copper alloy material according to claim 1, wherein formability of said copper alloy material is higher than or equal to 11.5 mm and lower than or equal to 12.3 mm.

17. The heat resistance copper alloy material according to claim 1, wherein the brazing treatment comprises treatment of said copper alloy material at 800° C. for 10 minutes followed by cooling at a rate of 20° C. per minute.

18. The heat resistance copper alloy material according to claim 1, wherein said copper alloy material is in the form of a pipe, plate, bar, wire or worked material obtained by working said pipe, plate, bar or wire material into predetermined shapes, wherein the thermal conductivity of the copper alloy material after brazing or after treatment under the same condition as the brazing is more than 0.67 cal/cm·sec·° C. but less than 0.76 cal/cm·sec·° C.

19. The heat resistance copper alloy material according to claim 1, wherein 0.2% proof stress of said copper alloy material is not less than 75 N/mm² after a brazing treatment or a heat treatment under the same condition as said brazing treatment.

20. The heat resistance copper alloy material according to claim 1, wherein 0.2% proof stress of said copper alloy material is not less than 90 N/mm² after a brazing treatment or a heat treatment under the same condition as said brazing treatment.

21. A heat resistance copper alloy material, comprising:

0.11 to 0.31 mass percent of Co;

0.041 to 0.089 mass percent of P;

0.02 to 0.25 mass percent of Sn;

0.01 to 0.40 mass percent of Zn;

0.01 to 0.17 mass percent of Ni, or 0.01 to 0.15 mass percent of Fe, or 0.01 to 0.17 mass percent of Ni and 0.01 to 0.15 mass percent of Fe; and the remaining mass percent of Cu and inevitable impurities, wherein the inevitable impurities include oxygen in an amount that is less than or equal to 0.0070 mass percent, wherein each content of Co, P, Sn, Zn, Ni and Fe satisfies the relationships $2.4 \leq ([Co]+0.8[Ni]+0.8[Fe]-0.02)/[P] \leq 5.2;$ $0.20 \leq [Co]+0.5[P]+0.9[Sn]+0.1[Zn]+0.9[Ni]+1.5[Fe] \leq 0.54;$ $0.15 \leq [Co]+0.8[Ni]+0.8[Fe] \leq 0.35;$ $1.2[Ni] < [Co];$ $1.5[Fe] < [Co];$ and $[Ni]+[Fe] < [Co],$ wherein [Co], [P], [Sn], [Zn], [Ni] and [Fe] are said mass percents of Co, P, Sn, Zn, Ni and Fe content, respectively, wherein said copper alloy material is a pipe, plate, bar, wire or worked material obtained by working said pipe, plate, bar or wire material into predetermined shapes, and wherein 0.2% proof stress of said copper alloy material is higher than or equal to 55 N/mm$^2$ after a brazing treatment at about 800° C.

* * * * *